United States Patent [19]

Noda et al.

[11] Patent Number: 5,399,643
[45] Date of Patent: Mar. 21, 1995

[54] METHOD FOR PREPARATION OF TETRAFLUOROETHYLENE/HEXAFLUOROPROPYLENE COPOLYMER

[75] Inventors: Tomohisa Noda; Hiroyuki Honda; Chuzo Okuno, all of Settsu, Japan

[73] Assignee: Daikin Industries Ltd., Osaka, Japan

[21] Appl. No.: 211,022

[22] PCT Filed: Jul. 9, 1992

[86] PCT No.: PCT/JP93/00949

§ 371 Date: Mar. 17, 1994

§ 102(e) Date: Mar. 17, 1994

[87] PCT Pub. No.: WO94/02522

PCT Pub. Date: Feb. 3, 1994

[30] Foreign Application Priority Data

Apr. 22, 1992 [JP] Japan .................................. 4-195147

[51] Int. Cl.$^6$ .............................................. C08F 4/32
[52] U.S. Cl. ...................................... 526/231; 526/254
[58] Field of Search ............................................ 526/231

[56] References Cited

U.S. PATENT DOCUMENTS

4,663,407  5/1987  Oka et al. ............................ 526/231

FOREIGN PATENT DOCUMENTS

1124242  2/1962  Germany ............................ 526/231
2104077  8/1971  Germany ............................ 526/231
4292605  10/1992  Japan ................................. 526/231

*Primary Examiner*—Joseph L. Schofer
*Assistant Examiner*—N. Sarofim
*Attorney, Agent, or Firm*—Spensley Horn Jubas & Lubitz

[57] ABSTRACT

A method for preparing a tetrafluoroethylene/hexafluoropropylene copolymer by polymerizing tetrafluoroethylene and hexafluoropropylene in an aqueous medium using a di(fluoroacyl) peroxide as a polymerization initiator characterized in that a fluoroalkylcarboxylic acid is added gives a stable molecular weight of the tetrafluoroethylene/hexafluoropropylene copolymer and an increased utilization efficiency of the polymerization initiator.

7 Claims, 1 Drawing Sheet

METHOD FOR PREPARATION OF TETRAFLUOROETHYLENE/HEXAFLUOROPROPYLENE COPOLYMER

FIELD OF THE INVENTION

The present invention relates to a method for preparing a tetrafluoroethylene/hexafluoropropylene copolymer.

RELATED ART

In the preparation of a tetrafluoroethylene/hexafluoropropylene copolymer, usually an alkali, for example, sodium bicarbonate ($NaHCO_3$) is added to an aqueous medium before the initiation of the polymerization in order to prevent the corrosion of a polymerization reactor so that an aqueous alkaline solution is formed, and then a large amount of a diperoxide initiator is added to conduct the polymerization. The reason why the alkali is added is that an acidic material such as hydrofluoric acid is prepared by the decomposition of the monomer during the polymerization so that the acidic material may corrode the polymerization reactor.

However, since the polymerization initiator tends to be easily hydrolyzed in the aqueous alkaline solution at the beginning of the polymerization, the polymerization initiator cannot be effectively utilized.

In addition, pH of the aqueous medium varies widely so that the hydrolysis conversion is unstable. Accordingly, the initiator efficiency is not constant and a resultant copolymer has an unstable molecular weight.

SUMMARY OF THE INVENTION

An object of the present invention is to stabilize the molecular weight of the tetrafluoroethylene/hexafluoropropylene copolymer prepared by the polymerization in the aqueous medium using the di(fluoroacyl) peroxide polymerization initiator so that the utilization efficiency of the polymerization, initiator is increased.

The present invention provides a method for preparing a tetrafluoroethylene/hexafluoropropylene copolymer by polymerizing tetrafluoroethylene and hexafluoropropylene in an aqueous medium using, as a polymerization initiator, a di(fluoroacyl) peroxide of the formula:

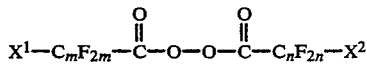

wherein $X^1$ and $X^2$ each is a hydrogen, fluorine or chlorine atom, m is an integer of 4 to 8 when $X^1$ is the hydrogen atom, and m is an integer of 3 to 8 when $X^1$ is the fluorine or chlorine atom, and n is an integer of 4 to 8 when $X^2$ is the hydrogen atom, and n is an integer of 3 to 8 when $X^2$ is the fluorine or chlorine atom, characterized in that a fluoroalkylcarboxylic acid of the formula:

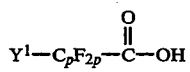

wherein $Y^1$ is a hydrogen, fluorine or chlorine atom, and p is an integer of 4 to 8 when $Y^1$ is the hydrogen atom, and p is an integer of 3 to 8 when $Y^1$ is the fluorine or chlorine atom, is added to a polymerization system before the initiation of the polymerization or during the polymerization.

DETAILED DESCRIPTION OF THE INVENTION

Figure 1:
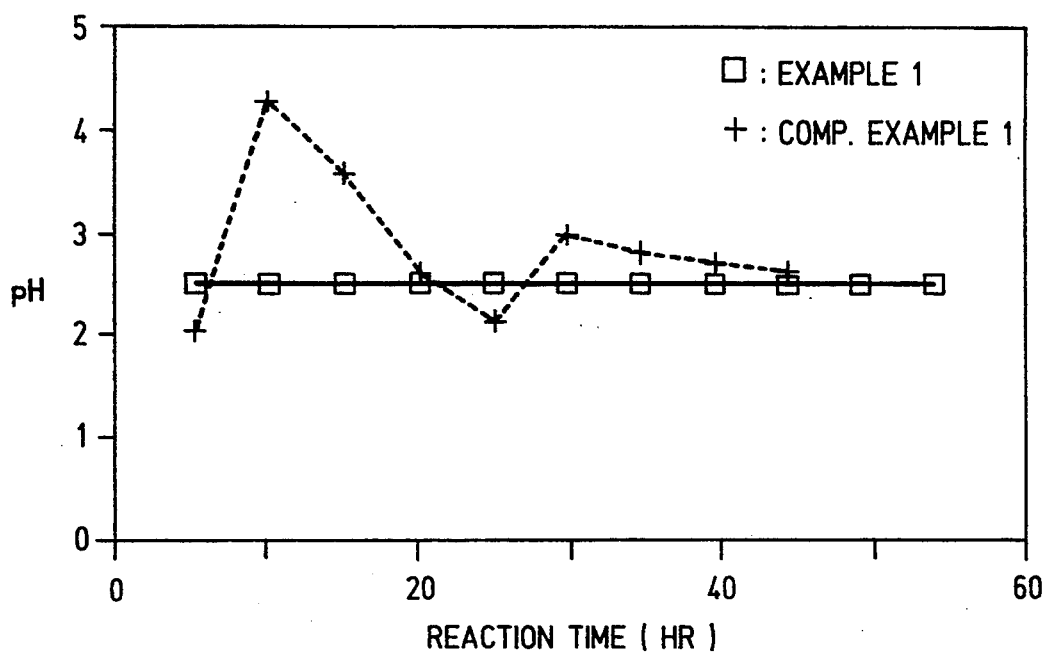
FIG. 1 is a graph showing a relationship between a reaction time and pH during the copolymerization of tetrafluoroethylene and hexafluoropropylene.

The $Y^1$—$C_pF_{2p}$— group in the fluoroalkylcarboxylic acid may be linear or branched. Specific examples of the fluoroalkylcarboxylic acid are ω-hydroperfluoroheptanoic acid, ω-hydroperfluorononanoic acid, ω-hydroperfluoroheptanoic acid, ω-hydroperfluoropentanoic acid, perfluoropropionic acid, perfluorobutanoic acid, perfluropentanoic acid, perfluorohexanoic acid, perfluoroheptanoic acid, perfluorooctanoic acid, perfluorononanoic acid and the like. Preferably, the amount of the used fluoroalkylcarboxylic acid is from 0.05 to 0.5 parts by weight per 100 parts by weight of water in the polymerization system.

The $X^1$—$C_mF_{2m}$— group and the $X^2$—$C_nF_{2n}$ group in the di(fluoroacyl) peroxide used as the polymerization initiator may be linear or branched and may be the same or different. Specific examples of the di(fluoroacyl)peroxide are di(ω-hydro-dodecafluoroheptanoyl) peroxide, di(ω-hydro-tetradecafluorooctanoyl) peroxide, di(ω-hydro-hexadecafluorononanoyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydro-dodecafluoroheptanoyl-ω-hydro-hexadecafluorononanoyl peroxide, ω-chloro-hexafluorobutyryl-ω-chloro-decafluorohexanoyl peroxide, ω-hydro-dodecafluoroheptanoyl-perfluorobutyryl peroxide and the like.

In the present invention, the amount of the used polymerization initiator is suitably determined according to the molecular weight of the copolymer and the contents of tetrafluoroethylene (referred to as "TFE" hereinafter) and hexafluoropropylene (referred to as "HFP" hereinafter) in the copolymer. Usually it is from about 0.01 to about 1 parts by weight per 100 parts by weight of the monomer. Since the polymerization initiator has a relatively high decomposition rate and the concentration of the polymerization initiator tends to decrease considerably during the polymerization reaction, if necessary, the polymerization initiator is suitably added to the polymerization system during the polymerization reaction.

Preferably, the $Y^1$—$C_pF_{2p}$— group in the fluoroalkylcarboxylic acid is the same as one, preferably both, of the $X^1$—$C_mF_{2m}$— group and the $X^2$—$C_nF_{2n}$— group in the di(fluoroacyl) peroxide.

The polymerization reaction is initiated by charging pure water and the fluoroalkylcarboxylic acid in a pressure vessel, adding TFE and HFP and then adding the polymerization initiator. The ratio by volume of water to the monomer is preferably from about 1:1 to about 10:1, particularly about 2:1 to about 5:1. The content of TFE in the TFE/HFP monomer mixture is determined according to the composition of the objective copolymer. There is the following relationship at about 20°–25° C.:

| The content of TFE in the monomer mixture (%) | The content of TFE in the copolymer (%) |
|---|---|
| 5 | 78 |
| 10 | 87 |
| 20 | 92 |

Water is used as the reaction medium. If necessary, a solvent in which TFE and HFP dissolve may be added in a suitable amount. Preferably, specific examples of such solvent are fluorine-containing solvents such as trichlorotrifluoroethane, monofluorotrichloromethane and the like. If necessary, any of an emulsion stabilizing agent such as polyvinyl alcohol and sodium carboxymethylcellulose, sodium bicarbonate and borax may be added.

A polymerization temperature is restricted mainly by the decomposition rate, of the polymerization initiator. The decomposition reaction of the polymerization initiator in the presence of water proceeds as a first-order reaction and a rate constant (k) of the reaction is, for example, as follows:

|  | 5° C. | 23° C. |
|---|---|---|
| $(HC_6F_{12}CO)_2O_2$ | 0.031 hr$^{-1}$ | 0.19 hr$^{-1}$ |
| $(C_3F_7CO)_2O_2$ | 0.043 hr$^{-1}$ | 0.14 hr$^{-1}$ |

At a temperature of at least 35° C., a half-life period of the polymerization initiator is about one hour and the concentration of the polymerization initiator remarkably changes so that such temperature is unsuitable for the uniform polymerization reaction. The polymerization temperature is usually selected from a temperature range between 0° and 35° C., particularly between 0° and 28° C. The pressure at the polymerization reaction is determined according to the content ratio of TFE to HFP in the mixture monomer, the presence/absence of the solvent, and the polymerization temperature. Generally, when the solvent is not used, the reaction pressure is suitably from about 5 to about 15 kg/cm$^2$ (an indicated pressure of a gauge, the same hereinafter). When trichlorotrifluoroethane and the like are used as the solvent, the reaction pressure varies according to the ratio of the solvent to the monomer and is suitably from about 0.5 to about 15 kg/cm$^2$.

As the reaction proceeds, the pressure in the polymerization system is decreased. In order to compensate the decrease of the pressure, only TFE may be added so as to continue the reaction. Alternatively, both of TFE and HFP may be added in the amounts corresponding to the amounts of the consumed monomers. The polymerization time depends on the yield of the objective copolymer as well as the amount of the used polymerization initiator, the ratio of TFE to HFP and the polymerization temperature. The polymerization time is usually selected from the time range between 2 hours and 100 hours. The presence of oxygen during the polymerization reaction is not preferable.

When the yield of the copolymer reaches the desired value, a crude TFE/HFP copolymer is obtained in the form of from fine particles to granules by recovering the monomer.

The TFE/HFP copolymer obtained by the method of the present invention has many advantages such as the advantage that it has an unchanged molten viscosity, is stable and has no black discoloration in the; step of the melt extrusion or in the step of thermally shaping the pelletized material after the extrusion (in addition, the method of the present invention is commercially remarkably more advantageous than the reactions in the solvent, since the former is the reaction in water). The method of the present invention can be advantageously used for the molded material and the like.

PREFERRED EMBODIMENT OF THE INVENTION

The present invention will be illustrated by the following

EXAMPLES

Example 1

In a jacketed glass-lined autoclave having a stirrer which can receive 7,500 parts by weight of water, demineralized deaerated pure water (2,000 parts by weight) and ω-hydroperfluoroheptanoic acid (a fluoroalkylcarboxylic acid) (1.0 parts by weight) were charged. The atmosphere in the autoclave was fully replaced with a pure nitrogen gas, and the nitrogen gas was removed. HFP (2,000 parts by weight) was injected in the autoclave and then TFE was injected so that the internal pressure in the autoclave was 8.3 kg/cm$^2$G. The temperature was adjusted at 25.5° C. and the stirring was initiated. Di(ω-hydrododecafluoroheptanoyl) peroxide was added as a polymerization initiator and methanol was added as a molecular weight controlling agent. The reaction was initiated immediately. During the reaction, TFE was gradually added according to the decrease of the pressure so as to maintain the constant pressure. After the reaction was conducted for 56.8 hours, the monomer was purged. A resultant polymer was separated, washed and dried to give a granular polymer.

The conditions of the polymerization reaction, and the yield and properties of the polymer are shown in Table 1. A specific melt viscosity of the polymer was measured as follows:

The specific melt viscosity means an apparent melt viscosity which is measured at 372° C. under a shear strength of 0.475 kg/cm$^2$. Namely, this value is measured by a melt indexer. The polymer is filled in a cylinder having an internal diameter of 11.4 mm and kept at 372° C. for 5 minutes. The polymer is extruded through an orifice having an internal diameter of 2.0 mm and a length of 8 mm under a piston load of 5 kg. The specific melt viscosity is calculated on the basis of the extrusion speed (MI (g/10 min.)) according to the following equation:

$$\text{Specific melt viscosity} = 10^{[(1.618-Log(MI))/0.980+4]} \text{ [poise]}$$

Comparative Example 1

The copolymerization of TFE and HFP was conducted in the same manner as in Example 1, except that the amounts of the used raw materials and the reaction conditions are shown in Table 1. The yield and properties of the resultant polymer are shown in Table 1.

TABLE 1

|  | Comp. Ex. 1 | Example 1 |
|---|---|---|
| Amounts of raw materials |  |  |
| Amount of used water [parts by weight] | 2,000 | 2,000 |
| Amount of charged HFP [parts by weight] | 2,000 | 2,000 |

TABLE 1-continued

| | Comp. Ex. 1 | Example 1 |
|---|---|---|
| Pressure of charged TFE [kg/cm$^2$G] | 8.30 | 8.30 |
| Fluoroalkylcarboxylic acid [parts by weight] | 0 | 1.0 |
| NaHCO$_3$ [parts by weight] | 1.25 | 0 |
| Amount of charged methanol [parts by weight] | First time 13.4 Second time 13.4 Third time 13.4 Fourth time 13.4 | First time 11.7 Second time 11.7 Third time 11.7 Fourth time 11.7 |
| Amount of charged polymerization initiator [parts by weight] | First time 2.85 Second time 2.85 Third time 1.13 Addition 0.19 | First time 2.0 Second time 2.0 Third time 1.13 Addition 0.19 |
| Conditions | | |
| Temperature [°C] | 25.5 | 25.5 |
| Reaction time [hr] | 58.0 | 56.8 |
| Polymer | | |
| Yield [parts by weight] | 2,500 | 2,500 |
| Specific melt viscosity [poise] | 6.5 × 10$^4$ | 6.5 × 10$^4$ |
| Melting point [°C] | 269 | 266 |

The pH change during the copolymerization is shown in FIG. 1. In the Comparative Example, the pH remarkably changes at the beginning of the copolymerization. But, in the Example, the pH is stable.

The results of a metal content of a shaped article after the heat melting are shown in Table 2. Table 2 shows that the metal content is low in Example 1.

TABLE 2

| | Comp. Ex. 1 | Example 1 |
|---|---|---|
| Iron ion | 23 | 4 |
| Nickel ion | 0 | 2 |
| Sodium ion | 640 | 67 |

Unit: ppb

Since, according to the method of the present invention, the hydrolysis of the initiator at the beginning of the polymerization is prevented and the initiator is effectively used, the amount of the initiator at the beginning of the polymerization can be decreased by at least 30%. The total amount of the catalyst can be decreased by, for example, at least 20 or 30%. The pH is constant from the beginning to the end of the polymerization so that the copolymer having a constant molecular weight can be prepared with high reproductivity. Since the polymerization vessel is less corroded during the polymerization, the metal content of the polymer is low. In addition, the polymer has low discoloration after the heat melting.

What is claimed is:

1. A method for preparing a tetrafluoroethylene/hexafluoropropylene copolymer by polymerizing tetrafluoroethylene and hexafluoropropylene in an aqueous medium using, as a polymerization initiator, a di(fluoroacyl) peroxide of the formula:

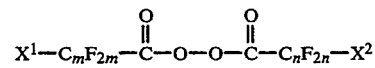

wherein $X^1$ and $X^2$ each is a hydrogen, fluorine or chlorine atom, m is an integer of 4 to 8 when $X^1$ is the hydrogen atom, and m is an integer of 3 to 8 when $X^1$ is the fluorine or chlorine atom, and n is an integer of 4 to 8 when $X^2$ is the hydrogen atom, and n is an integer of 3 to 8 when $X^2$ is the fluorine or chlorine atom, characterized in that a fluoroalkylcarboxylic acid of the formula:

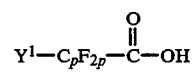

wherein $Y^1$ is a hydrogen, fluorine or chlorine atom, and p is an integer of 4 to 8 when $Y^1$ is the hydrogen atom, and p is an integer of 3 to 8 when $Y^1$ is the fluorine or chlorine atom, is added to a polymerization reaction before the initiation of the polymerization or during the polymerization.

2. The method according to claim 1, wherein the amount of the fluoroalkylcarboxylic acid is from 0.01 to 1.0 parts by weight per 100 parts by weight of water.

3. The method according to claim 1 wherein the fluoroalkylcarboxylic acid is selected from the group consisting of ω-hydroperfluoroheptanoic acid, ω-hydroperfluorononanoic acid, ω-hydroperfluoropentanoic acid, perfluoropropionic acid, perfluorobutanoic acid, perfluoropentanoic acid, perfluorohexanoic acid, perfluoroheptanoic acid, perfluorooctanoic acid and perfluorononanoic acid.

4. The method according to claim 1 wherein the di(fluoroacyl) peroxide is selected from the group consisting of di(ω-hydro-dodecafluoroheptanoyl) peroxide, di(ω-hydro-tetradecafluorooctanoyl) peroxide, di(ω-hydro-hexadecafluorononanoyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydro-dodecafluoroheptanoyl-ω-hydro-hexadecafluoroonoanoyl peroxide, ω-chloro-hexafluorobutyryl-ω-chloro-decafluorohexanoyl peroxide, and ω-hydro-dodecafluoroheptanoyl-perfluorobutyryl peroxide.

5. The method according to claim 1 wherein the $Y^1$—$C_pF_{2p}$— group in the fluoroalkylcarboxylic acid is the same as at least one of the $X^1$—$C_mF_{2m}$— group and the $X^2$—$C_nF_{2n}$— group in the di(fluoroacyl) peroxide.

6. The method according to claim 5 wherein the $Y^1$—$C_pF_{2p}$— group in the fluoroalkylcarboxylic acid is the same as both the $X^1$—$C_mF_{2m}$— group and the $X^2$—$C_nF_{2n}$— group in the di(fluoroacyl) peroxide.

7. The method according to claim 1 wherein the fluoroalkylcarboxylic acid is ω-hydroperfluoroheptanoic acid and the di(fluoroacyl) peroxide is di(ω-hydrododecafluoroheptanoyl) peroxide.

* * * * *